United States Patent
Trukhan et al.

(10) Patent No.: US 10,875,777 B2
(45) Date of Patent: Dec. 29, 2020

(54) PROCESS FOR THE PREPARATION OF A ZEOLITIC MATERIAL HAVING A FAU-TYPE FRAMEWORK STRUCTURE AND USE THEREOF IN THE SELECTIVE CATALYTIC REDUCTION OF $NO_x$

(71) Applicant: BASF Corporation, Florham Park, NJ (US)

(72) Inventors: Natalia Trukhan, Ludwigshafen am Rhein (DE); Alexander Panchenko, Ludwigshafen am Rhein (DE); Ulrich Mueller, Ludwigshafen am Rhein (DE)

(73) Assignee: BASF Corporation, Florham Park, NJ (US)

( * ) Notice: Subject to any disclaimer, the term of this patent is extended or adjusted under 35 U.S.C. 154(b) by 47 days.

(21) Appl. No.: 16/321,252

(22) PCT Filed: Jul. 28, 2017

(86) PCT No.: PCT/EP2017/069138
§ 371 (c)(1),
(2) Date: Jan. 28, 2019

(87) PCT Pub. No.: WO2018/019983
PCT Pub. Date: Feb. 1, 2018

(65) Prior Publication Data
US 2019/0169037 A1    Jun. 6, 2019

(30) Foreign Application Priority Data

Jul. 29, 2016   (EP) .................................. 16181859

(51) Int. Cl.
*C01B 39/20*    (2006.01)
*B01J 20/18*    (2006.01)
(Continued)

(52) U.S. Cl.
CPC ........ *C01B 39/205* (2013.01); *B01D 53/9418* (2013.01); *B01J 20/18* (2013.01);
(Continued)

(58) Field of Classification Search
CPC ........ C01B 39/205; C01B 39/24; B01J 20/18; B01J 29/08; B01J 29/084; B01J 29/146;
(Continued)

(56) References Cited

U.S. PATENT DOCUMENTS 4,052,337 A * 10/1977 Nishikawa ......... B01D 53/8628
                                                             502/60
4,748,012 A *  5/1988 Weber ................. B01J 37/0246
                                                            423/239.1

(Continued)

FOREIGN PATENT DOCUMENTS

| EP | 0 199 169 A1 | 10/1986 |
| WO | WO 2007/070639 A2 | 6/2007 |
| WO | WO 2010/062730 A2 | 6/2010 |

OTHER PUBLICATIONS

U.S. Appl. No. 15/509,527, filed Mar. 8, 2017, US 2017/0246620 A1, Andrei-Nicolae Parvulescu, et al.
(Continued)

*Primary Examiner* — David M Brunsman
(74) *Attorney, Agent, or Firm* — Oblon, McClelland, Maier & Neustadt, L.L.P.

(57) ABSTRACT

A process for the preparation of a zeolitic material having a FAU-type framework structure comprising $YO_2$ and $X_2O_3$, comprising: (a) preparing a mixture comprising one or more sources of $YO_2$, one or more sources of $X_2O_3$, and one or more structure directing agents (SDA); (b) crystallizing the zeolitic material from the mixture obtained in (a); wherein Y is a tetravalent element and X is a bivalent element, and wherein the one or more structure directing agents comprise
(Continued)

one or more isomers of diaminomethylcyclohexane. A zeolitic material having an FAU-type framework structure obtained according to the inventive process; processes for preparing a coated substrate and a shaped body, respectively, from the zeolitic material having a FAU-type framework structure obtained according to the inventive process and, a method for selectively reducing nitrogen oxides NOx employing said zeolitic material.

14 Claims, 4 Drawing Sheets

(51) Int. Cl.
| | |
|---|---|
| *B01J 29/14* | (2006.01) |
| *C01B 39/22* | (2006.01) |
| *C01B 39/24* | (2006.01) |
| *B01D 53/94* | (2006.01) |
| *B01J 35/10* | (2006.01) |
| *B01J 37/00* | (2006.01) |
| *B01J 37/02* | (2006.01) |
| *B01J 37/04* | (2006.01) |
| *B01J 37/06* | (2006.01) |
| *B01J 37/08* | (2006.01) |
| *B01J 37/30* | (2006.01) |
| *F01N 3/08* | (2006.01) |
| *F01N 3/20* | (2006.01) |

(52) U.S. Cl.
CPC .............. *B01J 29/14* (2013.01); *B01J 29/146* (2013.01); *B01J 35/1023* (2013.01); *B01J 37/009* (2013.01); *B01J 37/0018* (2013.01); *B01J 37/0036* (2013.01); *B01J 37/0215* (2013.01); *B01J 37/0225* (2013.01); *B01J 37/0236* (2013.01); *B01J 37/04* (2013.01); *B01J 37/06* (2013.01); *B01J 37/08* (2013.01); *B01J 37/30* (2013.01); *C01B 39/22* (2013.01); *C01B 39/24* (2013.01); *F01N 3/0807* (2013.01); *F01N 3/2066* (2013.01); *B01D 2255/50* (2013.01); *B01J 2229/186* (2013.01); *C01P 2002/72* (2013.01); *C01P 2006/12* (2013.01); *F01N 2370/04* (2013.01); *F01N 2370/24* (2013.01); *F01N 2510/063* (2013.01)

(58) Field of Classification Search
CPC . B01J 29/14; B01J 2229/186; B01D 53/9418; B01D 2255/50
See application file for complete search history.

(56) References Cited

U.S. PATENT DOCUMENTS

| | | | | |
|---|---|---|---|---|
| 5,174,977 | A * | 12/1992 | Chang | B01J 29/40 |
| | | | | 423/706 |
| 5,190,736 | A * | 3/1993 | Hellring | B01J 29/04 |
| | | | | 423/706 |
| 5,536,483 | A * | 7/1996 | Descat | B01D 53/8628 |
| | | | | 423/239.2 |
| 9,764,313 | B2 | 9/2017 | Trukhan et al. | |
| 9,889,437 | B2 | 2/2018 | Yang et al. | |
| 10,195,598 | B2 | 2/2019 | Riedel et al. | |
| 10,196,276 | B2 | 2/2019 | Maurer et al. | |
| 10,202,323 | B2 | 2/2019 | Parvulescu et al. | |
| 10,202,324 | B2 | 2/2019 | Vautravers et al. | |
| 2007/0134146 | A1* | 6/2007 | Bull | B01J 29/084 |
| | | | | 423/239.2 |
| 2010/0111796 | A1* | 5/2010 | Caudle | B01J 37/0244 |
| | | | | 423/239.2 |
| 2010/0172814 | A1 | 7/2010 | Bull et al. | |
| 2019/0169037 | A1* | 6/2019 | Trukhan | C01B 39/24 |

OTHER PUBLICATIONS

U.S. Appl. No. 16/202,918, filed Nov. 28, 2018, Stefan Maurer, et al.
U.S. Appl. No. 15/529,133, filed May 24, 2017, Jan-Oliver Weidert, et al.
U.S. Appl. No. 15/683,905, filed Aug. 23, 2017, US 2017/0368541 A1, Trukhan, et al.
U.S. Appl. No. 15/549,905, filed Aug. 9, 2017, US 2018/0022611 A1, Mathias Feyen, et al.
U.S. Appl. No. 15/752,991, filed Feb. 15, 2018, US 2018/0243691 A1, Ulrich Mueller, et al.
U.S. Appl. No. 15/518,945, filed Apr. 13, 2017, US 2017/0225959 A1, Stefan Maurer, et al.
U.S. Appl. No. 15/741,536, filed Jan. 3, 2018, US 2018/0201721 A1, Alexander Panchenko, et al.
U.S. Appl. No. 15/524,484, filed May 4, 2017, US 2017/0336030 A1, Matthias Weickert, et al.
U.S. Appl. No. 15/779,218, filed May 25, 2018, US 2018/0345245 A1, Stefan Maurer, et al.
U.S. Appl. No. 15/746,151, filed Jan. 19, 2018, US 2018/0208550 A1, Klaus Breuer, et al.
U.S. Appl. No. 15/776,603, filed May 16, 2018, US 2018/0327347, Andreas Weickgenannt, et al.
U.S. Appl. No. 15/508,725, filed Mar. 3, 2017, US 2017/0275076 A1, Todd Edgington, et al.
U.S. Appl. No. 15/521,924, filed Apr. 26, 2017, US 2018/0230117 A1, Joaquim Henrique Teles, et al.
U.S. Appl. No. 16/086,251, filed Sep. 18, 2018, Benedikt Kalo.
U.S. Appl. No. 15/746,183, filed Jan. 19, 2018, US 2018/0208745 A1, Nicolas Vautravers, et al.
U.S. Appl. No. 15/779,314, filed May 25, 2018, US 2018/0333696 A1, Julia Burckhart, et al.
U.S. Appl. No. 16/060,260, filed Jun. 7, 2018, US 2018/0362353 A1, Nicolas Vautravers, et al.
U.S. Appl. No. 16/076,600, filed Aug. 8, 2018, US 2019/0077779 A1, Dominic Riedel, et al.
U.S. Appl. No. 16/308,730, filed Dec. 10, 2018, Natalia Trukhan.
U.S. Appl. No. 15/775,657, filed May 11 2018, US 2018/0328601 A1, Matthias Weickert, et al.
U.S. Appl. No. 16/060,739, filed Jun. 8, 2018, US 2018/0362357 A1, Mathias Feyen, et al.
U.S. Appl. No. 16/318,221, filed Jan. 16, 2019, Joaquim Henrique Teles, et al.
U.S. Appl. No. 16/060,229, filed Jun. 7, 2018, Andrei-Nicolae Parvulescu, et al.
U.S. Appl. No. 16/315,345, filed Jan. 4, 2019, Joaquim Henrique Teles, et al.
U.S. Appl. No. 16/315,680, filed Jan. 7, 2019, Joaquim Henrique Teles, et al.
U.S. Appl. No. 16/307,999, filed Dec. 7, 2018, Thomas Ingram, et al.
U.S. Appl. No. 16/306,784, filed Dec. 3, 2018, Thomas Ingram, et al.
U.S. Appl. No. 16/310,645, filed Dec. 17, 2018, Andrei-Nicolae Parvulescu, et al.
U.S. Appl. No. 16/304,511, filed Nov. 26, 2018, Mathias Feyen, et al.
U.S. Appl. No. 16/308,928, filed Dec. 11, 2018, Stefan Marx, et al.
International Search Report and Written Opinion of the International Searching Authority dated Sep. 13, 2017 in PCT/EP2017/069138 filed Jul. 28, 2017, citing documents AA-AF, AJ-AL, AS and AT therein, 17 pages.
International Preliminary Report on Patentability dated Jan. 29, 2019 in PCT/EP2017/P069138 filed Jul. 28, 2017, citing documents AJ-AL, AS and AT therein, 9 pages.
Stephane Kieger, et al., "Selective Catalytic Reduction of Nitric Oxide by Ammonia over Cu-FAU Catalysts in Oxygen-Rich Atmosphere" Journal of Catalysis, vol. 183, No. 2, XP004443176, Apr. 25, 1999, pp. 267-280.
F. Delprato, et al., "Synthesis of New Silica-Rich Cubic and Hexagonal Faujasites Using Crown-Ether-Based Supramolecules as Templates", Zeolites, Elsevier Science Publishing, vol. 10, No. 6,

(56) References Cited

OTHER PUBLICATIONS

XP002615294, Jul. 1, 1990, pp. 546-552.
Ch. Baerlocher, et al., "Atlas OF Zeolite Framework Types" Fifth Revised Edition, Elsevier, 2001, 308 pages.
H. Robson, "Microporous and Mesoporous Materials" Elsevier, vol. 22, 1998, pp. 551-666.

* cited by examiner

PROCESS FOR THE PREPARATION OF A ZEOLITIC MATERIAL HAVING A FAU-TYPE FRAMEWORK STRUCTURE AND USE THEREOF IN THE SELECTIVE CATALYTIC REDUCTION OF $NO_x$

TECHNICAL FIELD

The present invention relates to a process for the preparation of a zeolitic material having a FAU-type framework structure comprising $YO_2$ and $X_2O_3$, in particular for selective catalytic reduction, as well as to a zeolitic material having an FAU-type framework structure obtainable and/or obtained according to the inventive process. Furthermore, the present invention relates to a process for preparing a coated substrate and a shaped body, respectively, from the zeolitic material having a FAU-type framework structure obtainable and/or obtained according to the inventive process as well as to a method for selectively reducing nitrogen oxides $NO_x$ employing said zeolitic material.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 5th edition, Elsevier, 20 London, England (2001).

Among these zeolites, zeolitic materials having a FAU-type framework structure are of particular interest as it can be an interesting catalyst for selective catalytic reduction (SCR), alkylation of aromatics, and other reactions catalyzed by Brönsted/Lewis centers. In particular, metal containing FAU zeolitic materials have found use in the field of selective catalytic reduction of nitrogen oxides (NOx) contained in exhaust gases.

For production of FAU-type framework structure zeolites, it has been found in H. Robson, Microporous Materials 22 (1998), 551-666 that they may be prepared in deionized water as solvent with a structure directing agent (SDA), i.e. 15-crown-5 ether. However, this process requires a crystallization of 8 days and an expensive template. Hence, the implementation of this process as well as the SDA used therein render the procedure long and expensive and thus not efficient for industrial production scale.

In view of increasingly restrictive emissions regulations for NOx emissions, in particular in the field of automotive exhaust gas emissions, there is however an ongoing need for the provision of more efficient catalyst materials which are active in the fresh and aged states in order to meet current and future requirements and regulations. Therefore, there is a need to provide a novel and improved process for the preparation a zeolitic material having a FAU-type framework structure being highly cost effective while being suitable for large-scale industrial production.

DETAILED DESCRIPTION

It is therefore an object of the present invention to provide an improved process for the preparation of a zeolitic material having a FAU-type framework structure, in particular for use in selective catalytic reduction, being highly cost effective while being suitable for large-scale industrial production, and an improved zeolitic material having a FAU-type framework structure obtainable and/or obtained by said process. Thus, it has surprisingly been found that an improved FAU-type zeolite may be obtained by using one or more isomers of diaminomethylcyclohexane as a structure directing agent. Furthermore, it has quite unexpectedly been found that the use of one or more isomers of diaminomethylcyclohexane affords a highly improved process for the production of zeolitic materials having a FAU-type framework structure, in particular with respect to the considerable increase in cost-effectiveness which may be achieved in view of the facile synthesis of the zeolitic materials of the present invention starting from inexpensive precursor compounds.

Therefore, the present invention relates to a process for the preparation of a zeolitic material having a FAU-type framework structure comprising $YO_2$ and $X_2O_3$, said process comprising:

(a) preparing a mixture comprising one or more sources of $YO_2$, one or more sources of $X_2O_3$, and one or more structure directing agents (SDA);

(b) crystallizing the zeolitic material from the mixture obtained in (a);

wherein Y is a tetravalent element and X is a trivalent element, and wherein the one or more structure directing agents comprise one or more isomers of diaminomethylcyclohexane.

Thus, it has surprisingly been found that by using one or more isomers of diaminomethylcyclohexane according to the inventive process as structure directing agent, a highly cost-effective process is provided, said process being also suitable for large-scale industrial production. Thus, as compared to a numerous cost-intensive structure directing agents used in zeolite synthesis of the prior art, the isomers of diaminomethylcyclohexane have a very competitive price.

As regards to the one or more sources of $YO_2$, wherein Y stands for a tetravalent element, preferred tetravalent elements according to the present invention include Si, Sn, Ge, as well as mixtures thereof. According to the present invention, it is particularly preferred that Y is Si.

In the present invention, it is preferred that the one or more sources of $YO_2$ comprises one or more compounds selected from the group consisting of fumed silica, colloidal silica, silica gel, solid silica, sodium silicate and mixtures of two or more thereof, wherein preferably the one or more sources of $YO_2$ comprises colloidal silica. According to the present invention, it is particularly preferred that colloidal silica is employed as the one or more sources of $YO_2$.

As regards to the one or more sources of $X_2O_3$, wherein X stands for a trivalent element, preferred trivalent elements according to the present invention including Al, B, In, Ga, as well as mixtures of two or more thereof. According to the present invention, it is particularly preferred that X includes Al, B, as well as mixtures thereof, wherein more preferably X is Al.

In the present invention, it is preferred that the one or more sources of $X_2O_3$ comprises one or more compounds selected from the group consisting of alumina, aluminates, aluminum salts and mixtures of two or more thereof, preferably consisting of alumina, aluminates and mixtures thereof, wherein more preferably the one or more sources of $X_2O_3$ comprises one or more aluminum salts, preferably an aluminate of an alkali metal and/or aluminum hydroxide, preferably aluminum hydroxide, wherein more preferably the one or more sources for $X_2O_3$ is an aluminate of an alkali metal and/or aluminum hydroxide, preferably an aluminate of an alkali metal, wherein the alkali metal is preferably selected from the group consisting of Li, Na, K, Rb, and Cs, wherein more preferably the alkali metal is Na and/or K, and wherein even more preferably the alkali metal is Na. According to the present invention, it is particularly preferred that sodium aluminate is employed as the one or more sources of $X_2O_3$.

Regarding to the one or more isomers of diaminomethylcyclohexane provided in (a) of the inventive process, there is no particular restriction as to the amount thereof provided that the type and/or amount thereof which is provided in (a) allows the crystallization of a zeolitic material having a FAU-type framework structure in (b). Thus, the isomers of diaminomethylcyclohexane provided in (a) of the inventive process comprise 65 to 95 wt. % of 2,4-diaminomethylcyclohexane and 5 to 35 wt. % of 2,6-diaminomethylcyclohexane, preferably 70 to 90 wt. % of 2,4-diaminomethylcyclohexane and 10 to 30 wt. % of 2,6-diaminomethylcyclohexane, more preferably 75 to 85 wt. % of 2,4-diaminomethylcyclohexane and 15 to 25 wt. % of 2,6-diaminomethylcyclohexane, and more preferably comprise 78 to 82 wt. % of 2,4-diaminomethylcyclohexane and 18 to 22 wt. % of 2,6-diaminomethylcyclohexane. According to the present invention, it is particularly preferred that the isomers of diaminomethylcyclohexane comprises 80 wt. % of 2,4-diaminomethylcyclohexane and 20 wt. % of 2,6-diaminomethylcyclohexane.

In (a) according to the present invention, the mixture can be prepared by any conceivable means, wherein mixing by agitation is preferred, preferably by means of stirring.

In the inventive process, it is preferred that the mixture prepared in (a) further comprises a solvent system comprising one or more solvents. According to the inventive process, there is no particular restriction whatsoever neither with respect to the type and/or number of the one or more solvents, nor with respect to the amount in which they may be used in the inventive process provided that a zeolitic material having a FAU-type framework structure may be crystallized in (b). According to the inventive process, it is however preferred that the one or more solvents is selected from the group consisting of polar protic solvents and mixtures thereof, more preferably from the group consisting of n-butanol, isopropanol, propanol, ethanol, methanol, water, and mixtures thereof, more preferably from the group consisting of ethanol, methanol, water, and mixtures thereof, wherein more preferably the solvent system comprises water. According to the inventive process, it is particularly preferred that water is used as the solvent system; even more preferably deionized water is used as the solvent system.

As regards the process of the present invention wherein a solvent system is preferably provided in (a), there is no particular restriction as to the amount in which it may be used, or as to the type of solvent system, however water is particularly preferred and even more deionised water. Thus, by way of example, relative to the amount of the solvent system provided (a), the molar ratio $H_2O:YO_2$ of the mixture prepared in (a) may range from 1 to 25, preferably from 4 to 20, more preferably from 6 to 18, more preferably from 8 to 17, more preferably from 10 to 16, and even more preferably from 12 to 14.

As regards the process of the present invention wherein one or more sources for $X_2O_3$ are provided in (a), no particular restriction applies according to the present invention neither regarding the type of the one or more sources for $X_2O_3$, nor with respect to amounts in which they are used. Thus, by way of example, relative to the amount of the one or more sources for $X_2O_3$ provided in the mixture of (a), the $YO_2:X_2O_3$ molar ratio of the mixture may range from 0.5 to 4, preferably from 2 to 14, preferably from 4 to 12, preferably from 6 to 10, preferably 7 to 9. According to the present invention, it is particularly preferred that the $YO_2:X_2O_3$ molar ratio of the mixture provided in (a) is comprised in the range of from 7.5 to 8.5.

According to the present invention, there is no restriction as to the amount of the one or more isomers of diaminomethylcyclohexane which may be provided in the mixture in (a) of the inventive process provided that a zeolitic material having a FAU-type framework structure can be crystallized in (b). Thus, by way of example, relative to the amount of the one or more isomers of diaminomethylcyclohexane provided in (a), the $YO_2$:diaminomethylcyclohexane molar ratio of the mixture prepared in (a) may range from 0.5 to 40, preferably from 2 to 20, preferably from 3 to 14, preferably from 4 to 12, preferably from 5 to 10, preferably from 6 to 8. According to the present invention, it is particularly preferred that the $YO_2$:diaminomethylcyclohexane molar ratio of the mixture provided in (a) is comprised in the range of from 6.5 to 7.5.

As regards the temperature and/or duration of the crystallizing in (b), no particular restriction applies such that suitable temperature and/or duration may be chosen provided that the mixture obtained in (a) may be effectively crystallized. Thus, by way of example, crystallizing in (b) may be performed at a temperature in the range of 50 to 250° C., preferably of 60 to 200° C., more preferably of 70 to 150° C., more preferably of 90 to 130° C., more preferably of 100 to 120° C. According to the inventive process, it is however particularly preferred that crystallizing in (b) is performed at a temperature in the range of 105 to 115° C. Further, by way of example, crystallizing in (b) may be effected for a duration of from 6 to 120 h, preferably for a duration of from 12 h to 84 h, preferably for a duration of from 24 h to 72 h, preferably from 30 h to 66 h, preferably from 36 h and 60 h, preferably from 42 h to 54 h, preferably from 46 h to 50 h. According to the inventive process, it is however particularly preferred that crystallizing in (b) is performed for a duration of from 47 h to 49 h, preferably 48 h.

Furthermore, it is preferred that the inventive process further comprises one or more of the following:

(c) isolating the zeolitic material, preferably by filtration; and/or (d) washing the zeolitic material with one or more solvents, preferably to obtain an electrical conductivity lower than 250 μS/cm³, wherein preferably said one or more solvents comprise water, wherein more preferably the zeolitic material is washed with deionized water; and/or (e) drying the zeolitic material obtained (c), and/or (d); and/or (f) calcining the zeolitic material obtained in (c), (d), and/or (e), wherein, independently from each other, (c), (d), (e), and/or (f) are preferably repeated one or more times.

As regards the temperature and/or duration of the drying in (e), no particular restriction applies such that suitable temperature and/or duration may be chosen provided that the mixture obtained in (c) and/or (d) may be effectively dried. Thus, by way of example, the drying in (e) is performed at a temperature in the range of 90 to 150° C., preferably of from 100 to 140° C. more preferably of 110 to 130° C. According to the inventive process it is however particularly preferred that drying in (e) is performed at a temperature in the range of 115 to 125° C.

Same applies accordingly relative to the calcining in (f) such that in principle any suitable temperature and/or duration may be chosen provided that the mixture obtained in (c), (d) and/or (e) may be effectively calcined. Thus, by way of example, the calcining in (f) is performed at a temperature in the range of 400 to 700° C., preferably in the range of 430 to 650° C., more preferably in the range of 460 to 620° C., more preferably in the range of 490 to 590° C. According to the inventive process, it is however particularly preferred that calcining in (f) is performed at a temperature in the range of 520 to 560° C., more preferably in the range of 530 to 550° C. Thus, by way of example, the calcining in (f) is performed for a duration of from 2 h to 12 h, preferably from 4 h to 8 h, preferably from 5 h to 7 h. According to the inventive process it is however particularly preferred that calcining in (f) is performed for a duration of from 5.5 h to 6.5 h, more preferably for 6 h.

Moreover, it is preferred that the inventive process further comprises:
(g) subjecting the zeolitic material obtained in (c), (d), (e), or (f) to an ion exchange procedure, wherein at least one ionic non-framework element or compound contained in the zeolitic material is ion-exchanged against one or more metal ions.

Furthermore, it is preferred that (g) of the inventive process includes:
(g.i) subjecting the zeolitic material obtained in (c), (d), (e), or (f) to an ion-exchange procedure, wherein at least one ionic non-framework element or compound contained in the zeolitic material is ion-exchanged against $NH_4^+$;
(g.ii) calcining the ion-exchanged zeolitic material obtained in (g.i) for obtaining the H-form of the zeolitic material;
(g.iii) subjecting the zeolitic material obtained in (g.ii) to an ion-exchange procedure, wherein $H^+$ contained in the zeolitic material as ionic non-framework element is ion-exchanged against one or more metal ions.

As regards the ion-exchange procedure in (g), the one or more metal ions are selected from the group consisting of ions of alkaline earth metal elements and/or transition metal elements, more preferably from the group consisting of ions of metals selected from group 4 and groups 6-11 of the Periodic Table of the Elements, preferably from group 4 and groups 8-11, wherein more preferably the one or more metal ions are selected from the group consisting of ions of Mg, Ti, Cu, Co, Cr, Ni, Fe, Mo, Mn, Ru, Rh, Pd, Ag, Os, Ir, Pt, Au, and mixtures of two or more thereof, more preferably from the group consisting of ions of Ti, Cu, Fe, Rh, Pd, Pt, and mixtures of two or more thereof, wherein more preferably the at least one ionic non-framework element or compound contained in the zeolitic material is ion-exchanged against Cu and/or Fe. According to the inventive process, it is however particularly preferred that the zeolitic material is ion-exchanged against Cu.

According to the present invention, it is preferred that the zeolitic material ion-exchanged in (g) is such as to obtain a loading of the one or more metal ions in the zeolitic material ranging from 0.1 to 15 wt.-% calculated as the element and based on 100 wt.-% of $YO_2$ contained in the zeolitic material, preferably from 0.5 to 25 wt.-%, more preferably from 1 to 20 wt.-%, more preferably from 3 to 17 wt.-%, more preferably from 5 to 15 wt.-%, more preferably from 7 to 13 wt.-%, more preferably from 8 to 12 wt.-%, more preferably from 9 to 11 wt.-%. According to the present invention, it is particularly preferred that in (g) the zeolitic material is such as to obtain a loading of the one or more metal ions in the zeolitic material ranging from 9.5 to 10.5 wt.-%, even more preferably as to obtain a loading of Cu in the zeolitic material ranging from 9.5 to 10.5 wt.-%.

Furthermore, the present invention relates to a zeolitic material having a FAU-type framework structure comprising $YO_2$ and $X_2O_3$ obtainable and/or obtained by the process of the present invention, wherein Y is a tetravalent element and X is a trivalent element.

It is preferred that the zeolitic material having a FAU-type framework structure obtained and/or obtainable by the inventive process has a loading of one or more metals ranging from 9.5 to 10.5 wt.-%, even more preferably has a loading of Cu ranging from 9.5 to 10.5 wt.-%.

It is also preferred that the zeolitic material having a FAU-type framework structure according to the present invention is selected from the group consisting of faujasite, [Al—Ge—O]-FAU, [Co—Al—P—O]-FAU, [Ga—Al—Si—O]-FAU, [Ga—Ge—O]-FAU, [Ga—Si—O]-FAU, beryllophosphate X, Dehydrated Na—X, dehydrated US-Y, LZ-210, Li-LSX, SAPO-37, Siliceous Na—Y, zeolite X (Linde X), zeolite Y (Linde Y), zincophosphate X and mixtures of two or more thereof, preferably selected from the group consisting of faujasite, [Al—Ge—O]-FAU, [Co—Al—P—O]-FAU, [Ga—Al—Si—O]-FAU, [Ga—Si—O]-FAU, Li-LSX, SAPO-37, zeolite X (Linde X), zeolite Y (Linde Y), zincophosphate X and mixtures of two or more thereof, even more preferably selected from the group consisting of [Co—Al—P—O]-FAU, [Ga—Al—Si—O]-FAU, [Ga—Si—O]-FAU, Li-LSX, SAPO-37, zeolite X (Linde X), zeolite Y (Linde Y) and mixtures of two or more thereof. It is particularly preferred that the zeolitic material having a FAU-type framework structure according to the present invention is selected from zeolite X (Linde X), zeolite Y (Linde Y) and mixtures thereof, more preferably the zeolitic material having a FAU-type framework structure is zeolite Y (Linde Y).

In addition to relating to a process for the preparation of a zeolitic material having a FAU-type framework structure and to a zeolitic material obtainable and/or obtained by said process, the present invention further relates to a process for preparing a coated substrate comprising:
(1) preparing a mixture comprising a solvent system and a zeolitic material obtainable and/or obtained from the process for preparing a zeolitic material having a FAU-type framework structure according to the present invention, wherein the zeolitic material is ion-exchanged;
(1.a) homogenizing the mixture obtained in (1)
(1.b) providing a support substrate;
(1.c) coating the support substrate provided in (1.b) with the homogenized mixture obtained in (1.a);
(1.d) optionally drying the coated support substrate obtained in (1.c);
(2) calcining the coated support obtained in (1.c) or (1.d).

According to the present invention, the mixture in (1) may be prepared in any suitable fashion provided that a homogeneous mixture of the zeolitic material and the solvent system is obtained. Thus, it is preferred according to the present invention that preparing the mixture in (1) includes homogenizing the mixture by stirring, kneading, agitating, vibrating or combinations of two or more thereof, preferably by stirring and/or agitating, and more preferably by stirring.

As regards the temperature and/or duration of the optionally drying in (1.d), no particular restriction applies such that suitable temperature and/or duration may be chosen provided that the mixture obtained in (1.c) may be dried to a certain extent. Thus, by way of example, drying in (1.d) may be performed at a temperature in the range from 50 to 220° C., preferably in the range from 70 to 180° C., more preferably from 80 to 150° C., more preferably from 90 to 130° C., more preferably from 100 to 125° C. and more preferably from 110 to 120° C. Independently thereof, the duration of the optionally drying in (1.d) may range from 1 to 7 hours, wherein it is preferred that said drying is performed for a duration in the range from 4 to 6 hours, and more preferably in the range from 4.5 to 5.5 hours.

Same applies accordingly relative to the calcining in (2) of the coated support substrate obtained in (1.c) or (1.d) wherein calcining in (2) such that in principle any suitable temperature and/or duration may be chosen provided that the coated support substrate may be effectively calcined. Thus, by way of example, calcining in (2) of the coated support substrate as obtained in (1.c) or (1.d) may be performed at a temperature in the range from 300 to 750° C., wherein preferably calcining in (2) is performed at a temperature in the range from 325 to 650° C., more preferably from 350 to 600° C., more preferably from 375 to 550° C., more preferably from 400 to 500° C. According to the inventive process, it is however particularly preferred that calcining in (2) is performed at a temperature in the range from 425 to 475° C. Independently thereof, the duration of the calcination in (2) of the coated support substrate as obtained in (1.c) or (1.d) is again not in any way restricted provided that at the calcination temperature which is chosen the coated support substrate may be effectively calcined. Thus, by way of example, calcining in (2) of the coated support substrate as obtained in (1.c) or (1.d) may be performed at a temperature ranging anywhere from 3 to 7 h, wherein preferably the duration of the calcining in (2) of the coated support substrate ranges from 4 to 6 h. According to the inventive process, it is particularly preferred that calcining in (2) is performed for a duration ranging from 4.5 to 5.5 h, more preferably for a duration of 5 h.

According to the present invention, the coating in (1.c) is preferably performed by spray coating and/or wash coating, preferably by wash coating.

Furthermore, the coating in (1.c) is preferably repeated once or more, preferably once to five times, more preferably once to four times, more preferably once to three times, more preferably once or twice, and more preferably once.

According to the inventive process for preparing a coated substrate, the support substrate provided in (1.b) is selected from the group consisting of granules, pellets, meshes, rings, spheres, cylinders, hollow cylinders, monoliths and mixtures and/or combinations of two or more thereof, wherein preferably the support substrate is a monolith, more preferably a honeycomb monolith, wherein the honeycomb monolith is preferably a wall-flow or flow-through monolith. According to the present invention, it is particularly preferred that the support substrate provided in (1.b) is a wall-flow monolith.

According to the present invention, it is preferred that the support substrate provided in (1.b) comprises ceramic and/or metallic substances, preferably ceramic substances, more preferably one or more ceramic substances selected from the group consisting of alumina, silica, silicates, aluminosilicates, aluminotitanates, silicon carbide, cordierite, mullite, zirconium, spinels, magnesia, titania and mixtures of two or more thereof, more preferably from the group consisting of alumina, aluminotitanates, silicon carbide, cordierite and mixtures of two or more thereof, more preferably from the group consisting of $Al_2TiO_5$, SiC, cordierite and mixtures of two or more thereof, wherein more preferably the support substrate comprises SiC. Further, it is particularly preferred that the support substrate provided in (1.b) consists of SiC.

The present invention further relates to a process for preparing a shaped body comprising: (1) preparing a mixture comprising a solvent system and a zeolitic material obtainable and/or obtained from the process for preparing a zeolitic material having a FAU-type framework structure according to the present invention, wherein the zeolitic material is ion-exchanged;
(1.A) adding a refractory support material, and optionally adding a pasting agent, to the mixture obtained in (1);
(1.B) homogenizing the mixture obtained in (1.A); and
(1.C) shaping of the mixture obtained in (1.B);
(2') calcining the shaped mixture obtained in (1.C).

As regards the refractory support material used in (1.A), there is no particular restriction either with respect to the type of support material, nor to the amount of said support material. Thus, by way of example, the refractory support material may be selected from the group consisting of alumina, silica, titania, zirconia, magnesia, and mixtures of two or more thereof. According to the present invention, it is particularly preferred that the refractory support material is alumina, even more preferably gamma alumina.

Shaping in (1.C) is preferably performed by extrusion.

Furthermore, the inventive process for preparing a shaped body further comprises in (1):(1.D) drying of the mixture obtained in (1.C) prior to calcining thereof in (2').

As regards the temperature and/or duration of the drying in (1.D), no particular restriction applies such that suitable temperature and/or duration may be chosen provided that the mixture obtained in (1.C) may be dried to a certain extent. Thus, by way of example, drying in (1.D) may be performed at a temperature in the range from 80 to 160° C., preferably in the range from 100 to 140° C. According to the present invention it is further preferred that drying in (1.D) is performed in the range from 110 to 130° C., more preferably at 120° C. Independently thereof, the duration of the optionally drying in (1.D) may be performed for a duration of from 1 to 7 h, preferably for a duration of from 4 to 6 h, and more preferably for a duration of from 4.5 to 5.5 h.

Same applies accordingly relative to the calcining in (2') of the mixture obtained in (1.C) or (1.D) wherein calcining in (2') is such that in principle any suitable temperature and/or duration may be chosen provided that the mixture may be effectively calcined. Thus, by way of example, calcining in (2') of the mixture obtained in (1.C) or (1.D) may be performed at a temperature in the range of 250 to 700° C., preferably in the range of 400 to 600° C., more preferably in the range of 450 to 590° C. It is particularly preferred that the calcining in (2') of the mixture obtained in (1.C) or (1.D) is performed at a temperature in the range of 520 to 560° C., more preferably in the range of 530 to 550° C., even more preferably at 540° C. Independently thereof, the duration of the calcination in (2') of the mixture obtained in (1.C) or (1.D) is again not restricted in any way provided that at the calcination temperature which is chosen the mixture may be effectively calcined. Thus, by way of example, calcining in (2') of the mixture obtained in (1.c) or (1.d) may be performed for a duration of from 1 to 8 h, preferably for a duration of from 3 to 7 h, more preferably from 4 to 6 h. According to the inventive process, it is particularly preferred that calcining in (2') is effected for a duration ranging of from 4.5 to 5.5 h, more preferably for a duration of 5 h.

In the inventive process, it is preferred that the solvent system provided in (1) comprises one or more solvents. According to the inventive process, there is no there is no particular restriction whatsoever neither with respect to the type and/or number of the one or more solvents, nor with respect to the amount in which they may be used in the inventive process. According to the inventive process, it is however preferred that the one or more solvents is selected from the group consisting of polar protic solvents and mixtures thereof, more preferably from the group consisting of n-butanol, isopropanol, propanol, ethanol, methanol, water, and mixtures thereof, more preferably from the group consisting of ethanol, methanol, water, and mixtures thereof, even more preferably the solvent system comprises water. According to the present invention, it is particularly preferred that water is used as the solvent system preferably deionized water.

In addition to relating to a process for the preparation of a zeolitic material having a FAU-type framework structure and a process for preparing a coated substrate and a shaped body from a zeolitic material obtained and/or obtainable according to the present invention, respectively the present invention further relates to a method for selectively reducing nitrogen oxides NOx comprising:

contacting a gas stream containing NOx with a zeolitic material obtainable and/or obtained from the inventive process, wherein at least one ionic non-framework element or compound contained in the zeolitic material is ion-exchanged against Cu and/or Fe.

It is preferred that the gas stream containing NOx further comprises one or more reducing agents, the one or more reducing agents preferably comprising urea and/or ammonia. According to the present invention, it is particularly preferred that the one or more reducing agents comprise ammonia.

Furthermore, it is preferred that the gas stream comprises one or more $NO_x$ containing waste gases, preferably one or more NO containing waste gases from one or more industrial processes, wherein more preferably the $NO_x$ containing waste gas stream comprises one or more waste gas streams obtained in processes for producing adipic acid, nitric acid, hydroxylamine derivatives, caprolactame, glyoxal, methylglyoxal, glyoxylic acid or in processes for burning nitrogenous materials, including mixtures of waste gas streams from two or more of said processes.

According to the inventive method, it is preferred that the gas stream comprises a $NO_x$ containing waste gas stream from an internal combustion engine, preferably from an internal combustion engine which operates under lean-burn conditions, and more preferably from a lean-burn gasoline engine or from a diesel engine.

Finally, the present invention also relates to the use of a zeolitic material obtainable and/or obtained from the process for preparing a zeolitic material having a FAU-type framework structure according to the present invention as a molecular sieve, as an adsorbent, for ion exchange, as a catalyst and/or catalyst support, preferably as a catalyst and/or catalyst support, more preferably as a catalyst and/or catalyst support for the selective catalytic reduction (SCR) of $NO_x$ in exhaust gas or as a catalyst for the alkylation of aromatics, more preferably as a catalyst and/or catalyst support for the selective reduction of $NO_x$.

The present invention is further characterized by the following and particular preferred embodiments, including the combination and embodiments indicated by the respective dependencies:

1. A process for the preparation of a zeolitic material having a FAU-type framework structure comprising $YO_2$ and $X_2O_3$, said process comprising:
    (a) preparing a mixture comprising one or more sources of $YO_2$, one or more sources of $X_2O_3$, and one or more structure directing agents (SDA);
    (b) crystallizing the zeolitic material from the mixture obtained in (a);
    wherein Y is a tetravalent element and X is a trivalent element, and
    wherein the one or more structure directing agents comprise one or more isomers of diaminomethylcyclohexane.

2. The process of embodiment 1, wherein Y is selected from the group consisting of Si, Sn, Ge, and mixtures of two or more thereof, wherein preferably Y is Si.

3. The process of embodiment 1 or 2, wherein the one or more sources of $YO_2$ comprises one or more compounds selected from the group consisting of fumed silica, colloidal silica, silica gel, solid silica, sodium silicate and mixtures of two or more thereof, wherein preferably the one or more sources of $YO_2$ comprises colloidal silica, wherein more preferably colloidal silica is employed as the source of $YO_2$.

4. The process of any one of embodiments 1 to 3, wherein X is selected from the group consisting of Al, B, In, Ga and mixtures of two or more thereof, preferably selected from the group consisting of Al, B and mixtures thereof, wherein preferably X is Al.

5. The process of any of embodiments 1 to 4, wherein the one or more sources of $X_2O_3$ comprises one or more compounds selected from the group consisting of alumina, aluminates, aluminum salts and mixtures of two or more thereof, preferably consisting of alumina, aluminates and mixtures thereof, wherein more preferably the one or more sources of $X_2O_3$ comprises one or more aluminum salts, preferably an aluminate of an alkali metal and/or aluminum hydroxide, preferably aluminum hydroxide, wherein more preferably the one or more sources for $X_2O_3$ is an aluminate of an alkali metal and/or aluminum hydroxide, preferably an aluminate of an alkali metal,
    wherein the alkali metal is preferably selected from the group consisting of Li, Na, K, Rb, and Cs, wherein more preferably the alkali metal is Na and/or K, and wherein even more preferably the alkali metal is Na.

6. The process of any one of embodiments 1 to 5, wherein the isomers of diaminomethylcyclohexane comprise 65 to 95 wt. % of 2,4-diaminomethylcyclohexane and 5 to 35 wt. % of 2,6-diaminomethylcyclohexane, preferably 70 to 90 wt. % of 2,4-diaminomethylcyclohexane and 10 to 30 wt. % of 2,6-diaminomethylcyclohexane, more preferably 75 to 85 wt. % of 2,4-diaminomethylcyclohexane and 15 to 25 wt. % of 2,6-diaminomethylcyclohexane, and more preferably comprise 78 to 82 wt. % of 2,4-diaminomethylcyclohexane and 18 to 22 wt. % of 2,6-diaminomethylcyclohexane.

7. The process of any one of embodiments 1 to 6, wherein the mixture prepared in (a) further comprises a solvent system comprising one or more solvents, wherein the solvent system preferably comprises one or more solvents selected from the group consisting of polar protic solvents and mixtures thereof,
    more preferably from the group consisting of n-butanol, isopropanol, propanol, ethanol, methanol, water, and mixtures thereof,
    more preferably from the group consisting of ethanol, methanol, water, and mixtures thereof,
    wherein more preferably the solvent system comprises water, and wherein more preferably water is used as the solvent system, preferably deionized water.

8. The process of embodiment 8, wherein the molar ratio $H_2O:YO_2$ of the mixture prepared in (a) ranges from 1 to 25, preferably from 4 to 20, more preferably from 6 to 18, more preferably from 8 to 17, more preferably from 10 to 16, and even more preferably from 12 to 14.

9. The process of any one of embodiments 1 to 8, wherein the molar ratio $YO_2:X_2O_3$ of the mixture prepared in (a) is in the range from 0.5 to 40, preferably from 2 to 14, preferably from 4 to 12, preferably from 6 to 10, preferably 7 to 9, preferably from 7.5 to 8.5.

10. The process of any one of embodiments 1 to 9, wherein the molar ratio $YO_2$:diaminomethylcyclohexane of the mixture prepared in (a) is in the range from 0.5 to 40, preferably from 2 to 20, preferably from 3 to 14, preferably from 4 to 12, preferably from 5 to 10, preferably from 6 to 8, preferably from 6.5 to 7.5.

11. The process of any one of embodiments 1 to 10, wherein the crystallizing in (b) involves heating of the mixture at a temperature in the range of 50 to 250° C., preferably of 60 to 200° C., more preferably of 70 to 150° C., more preferably of 90 to 130° C., more preferably of 100 to 120° C., more preferably of 105 to 115° C.

12. The process of embodiment 11, wherein the crystallizing in (b) involves heating of the mixture for a duration of from 6 to 120 h, preferably for a duration of from 12 h to 84 h, preferably for a duration of from 24 h to 72 h, preferably from 30 h to 66 h, preferably from 36 h and 60 h, preferably from 42 h to 54 h, preferably from 46 h to 50 h.

13. The process of any one of embodiments 1 to 12, wherein the process further comprises one or more of the following:
(c) isolating the zeolitic material, preferably by filtration; and/or
(d) washing the zeolitic material with one or more solvents, preferably to obtain an electrical conductivity lower than 250 µS/cm³, wherein preferably said one or more solvents comprise water, wherein more preferably the zeolitic material is washed with deionized water;
and/or
(e) drying the zeolitic material obtained (c), and/or (d); and/or
(f) calcining the zeolitic material obtained in (c), (d), and/or (e), wherein, independently from each other, (c), (d), (e), and/or (f) are preferably repeated one or more times.

14. The process of embodiment 13, wherein drying in (e) is performed at a temperature in the range of 90 to 150° C., preferably of from 100 to 140° C. more preferably of 110 to 130° C., and more preferably of 115 to 125° C.

15. The process of embodiment 13 or 14, wherein calcining in (f) is performed at a temperature in the range of 400 to 700° C., preferably in the range of 430 to 650° C., more preferably in the range of 460 to 620° C., more preferably in the range of 490 to 590° C., and more preferably in the range of 520 to 560° C.

16. The process of any of embodiments 13 to 15, wherein calcining in (f) is performed for a duration of from 2 h to 12 h, preferably from 4 h to 8 h, preferably from 5 h to 7 h, preferably from 5.5 h to 6.5 h.

17. The process of embodiment 13 to 16, wherein the process further comprises:
(g) subjecting the zeolitic material obtained in (c), (d), (e), or (f) to an ion exchange procedure, wherein at least one ionic non-framework element or compound contained in the zeolitic material is ion-exchanged against one or more metal ions.

18. The process of embodiment 17, wherein, in (g), subjecting the zeolitic material to an ion-exchange procedure includes
(g.i) subjecting the zeolitic material obtained in (c), (d), (e), or (f) to an ion-exchange procedure, wherein at least one ionic non-framework element or compound contained in the zeolitic material is ion-exchanged against $NH_4^+$;
(g.ii) calcining the ion-exchanged zeolitic material obtained in (g.i) for obtaining the H-form of the zeolitic material;
(g.iii) subjecting the zeolitic material obtained in (g.ii) to an ion-exchange procedure, wherein $H^+$ contained in the zeolitic material as ionic non-framework element is ion-exchanged against one or more metal ions.

19. The process of embodiment 17 or 18, wherein the one or more metal ions are selected from the group consisting of ions of alkaline earth metal elements and/or transition metal elements, more preferably from the group consisting of ions of metals selected from group 4 and groups 6-11 of the Periodic Table of the Elements, preferably from group 4 and groups 8-11, wherein more preferably the one or more metal ions are selected from the group consisting of ions of Mg, Ti, Cu, Co, Cr, Ni, Fe, Mo, Mn, Ru, Rh, Pd, Ag, Os, Ir, Pt, Au, and mixtures of two or more thereof, more preferably from the group consisting of ions of Ti, Cu, Fe, Rh, Pd, Pt, and mixtures of two or more thereof, wherein more preferably the at least one ionic non-framework element or compound contained in the zeolitic material is ion-exchanged against Cu and/or Fe, preferably against Cu.

20. The process of any one of embodiments 17 to 19, wherein in (g) the zeolitic material is ion-exchanged such as to obtain a loading of the one or more metal ions in the zeolitic material ranging from 0.1 to 15 wt.-% calculated as the element and based on 100 wt.-% of $YO_2$ contained in the zeolitic material, preferably from 0.5 to 25 wt.-%, more preferably from 1 to 20 wt.-%, more preferably from 3 to 17 wt.-%, more preferably from 5 to 15 wt. %, more preferably from 7 to 13 wt.-%, more preferably from 8 to 12 wt.-%, more preferably from 9 to 11 wt.-%, and more preferably from 9.5 to 10.5 wt.-%.

21. A zeolitic material having a FAU-type framework structure comprising $YO_2$ and $X_2O_3$ obtainable and/or obtained by the process of any one of embodiments 1 to 20, wherein Y is a tetravalent element and X is a trivalent element.

22. A process for preparing a coated substrate comprising:
(1) preparing a mixture comprising a solvent system and a zeolitic material according to embodiment 21;
(1.a) homogenizing the mixture obtained in (1);
(1.b) providing a support substrate;
(1.c) coating the support substrate provided in (1.b) with the homogenized mixture obtained in (1.a);
(1.d) optionally drying the coated support substrate obtained in (1.c);
(2) calcining the coated support obtained in (1.c) or (1.d).

23. The process of embodiment 22, wherein the optional drying in (1.d) is performed at a temperature in the range from 50 to 220° C., preferably in the range from 70 to 180° C., more preferably from 80 to 150° C., more preferably from 90 to 130° C., more preferably from 100 to 125° C., and more preferably from 110 to 120° C.

24. The process of embodiment 22 or 23, wherein calcining in (2) is performed at a temperature in the range from 300 to 750° C., more preferably from 325 to 650° C., more preferably from 350 to 600° C., more preferably from 375 to 550° C., more preferably from 400 to 500° C., and more preferably from 425 to 475° C.
25. The process of any one of embodiments 22 to 24, wherein the homogenizing in (1.a) is performed by stirring, kneading, agitating, vibrating or combinations of two or more thereof, preferably by stirring and/or agitating, and more preferably by stirring.
26. The process of any one of embodiments 22 to 25, wherein the coating in (1.c) is performed by spray coating and/or wash coating, preferably by wash coating.
27. The process of any one of embodiments 22 to 26, wherein (1.c) is repeated once or more, preferably once to five times, more preferably once to four times, more preferably once to three times, more preferably once or twice, and more preferably once.
28. The process of any one of embodiments 22 to 27, wherein the support substrate is selected from the group consisting of granules, pellets, meshes, rings, spheres, cylinders, hollow cylinders, monoliths and mixtures and/or combinations of two or more thereof, wherein preferably the support substrate is a monolith, more preferably a honeycomb monolith, wherein the honeycomb monolith is preferably a wall-flow or flow-through monolith, preferably a wall-flow monolith.
29. The process of any one of embodiments 22 to 28, wherein the support substrate comprises ceramic and/or metallic substances, preferably ceramic substances, more preferably one or more ceramic substances selected from the group consisting of alumina, silica, silicates, aluminosilicates, aluminotitanates, silicon carbide, cordierite, mullite, zirconium, spinels, magnesia, titania and mixtures of two or more thereof, more preferably from the group consisting of α-alumina, aluminotitanates, silicon carbide, cordierite and mixtures of two or more thereof, more preferably from the group consisting of $Al_2TiO_5$, SiC, cordierite and mixtures of two or more thereof, wherein more preferably the support substrate comprises SiC, wherein more preferably the support substrate consists of SiC.
30. A process for preparing a shaped body comprising:
   (1) preparing a mixture comprising a solvent system and a zeolitic material according to embodiment 21;
   (1.A) adding a refractory support material, and optionally adding a pasting agent to the mixture obtained in (1);
   (1.B) homogenizing the mixture obtained in (1.A); and
   (1.C) shaping of the mixture obtained in (1.B);
   (2') calcining the shaped mixture obtained in (1.C).
31. The process of embodiment 30, wherein the refractory support material is selected from the group consisting of alumina, silica, titania, zirconia, magnesia, and mixtures of two or more thereof, wherein preferably the refractory support material is alumina, preferably gamma alumina.
32. The process of embodiment 30 or 31, wherein shaping in (1.C) is performed by extrusion.
33. The process of any one of embodiments 30 to 32, wherein (1) further comprises:
   (1.D) drying of the mixture obtained in (1.C) prior to calcining thereof in (2').
34. The process of embodiment 33, wherein in (1.D) drying is performed at a temperature in the range of 80 to 160° C., preferably in the range of 100 to 140° C., and more preferably in the range of 110 to 130° C.
35. The process of embodiment 33 or 34, wherein in (1.D) drying is performed for a duration of from 1 to 7 h, preferably for a duration of from 4 to 6 h, and more preferably for a duration of from 4.5 to 5.5 h.
36. The process of any one of embodiments 30 to 35, wherein calcining in (2') is performed at a temperature in the range of 250 to 700° C., preferably in the range of 400 to 600° C., more preferably in the range of 450 to 590° C., and more preferably in the range of 520 to 560° C.
37. The process of any one of embodiments 30 to 36, wherein calcining in (2') is performed for a duration of from 1 to 8 h, preferably for a duration of from 3 to 7 h, more preferably from 4 to 6 h, and more preferably for a duration of from 4.5 to 5.5 h.
38. The process of any one of embodiments 22 to 37, wherein the solvent system comprises one or more solvents, wherein the solvent system preferably comprises one or more solvents selected from the group consisting of polar protic solvents and mixtures thereof, more preferably from the group consisting of n-butanol, isopropanol, propanol, ethanol, methanol, water, and mixtures thereof, more preferably from the group consisting of ethanol, methanol, water, and mixtures thereof,
   wherein more preferably the solvent system comprises water, and wherein more preferably water is used as the solvent system, preferably deionized water.
39. A method for selectively reducing nitrogen oxides NOx comprising:
   contacting a gas stream containing NOx with a zeolitic material according to embodiment 21, wherein at least one ionic non-framework element or compound contained in the zeolitic material is ion-exchanged against Cu and/or Fe.
40. The method of embodiment 39, wherein the gas stream further comprises one or more reducing agents, the one or more reducing agents preferably comprising urea and/or ammonia, preferably ammonia.
41. The method of embodiment 39 or 40, wherein the gas stream comprises one or more NOx containing waste gases, preferably one or more $NO_x$ containing waste gases from one or more industrial processes, wherein more preferably the $NO_x$ containing waste gas stream comprises one or more waste gas streams obtained in processes for producing adipic acid, nitric acid, hydroxylamine derivatives, caprolactame, glyoxal, methyl-glyoxal, glyoxylic acid or in processes for burning nitrogeneous materials, including mixtures of waste gas streams from two or more of said processes.
42. The method of any one of embodiments 39 to 40, wherein the gas stream comprises a $NO_x$ containing waste gas stream from an internal combustion engine, preferably from an internal combustion engine which operates under lean-burn conditions, and more preferably from a lean-burn gasoline engine or from a diesel engine.
43. Use of a zeolitic material according to embodiment 21 as a molecular sieve, as an adsorbent, for ion exchange, as a catalyst and/or catalyst support, preferably as a catalyst and/or catalyst support, more preferably as a catalyst and/or catalyst support for the selective catalytic reduction (SCR) of NON in exhaust gas or as a catalyst for the alkylation of aromatics, more preferably as a catalyst and/or catalyst support for the selective reduction of NON.

DESCRIPTION OF THE FIGURES

The X-ray diffraction (XRD) patterns shown in the Figures were respectively measured using Cu K alpha-1 radiation. In the respective diffractograms, the diffraction angle 2 theta in ° is shown along the abscissa and the intensities are plotted along the ordinate.

EXAMPLES

Figure 1:
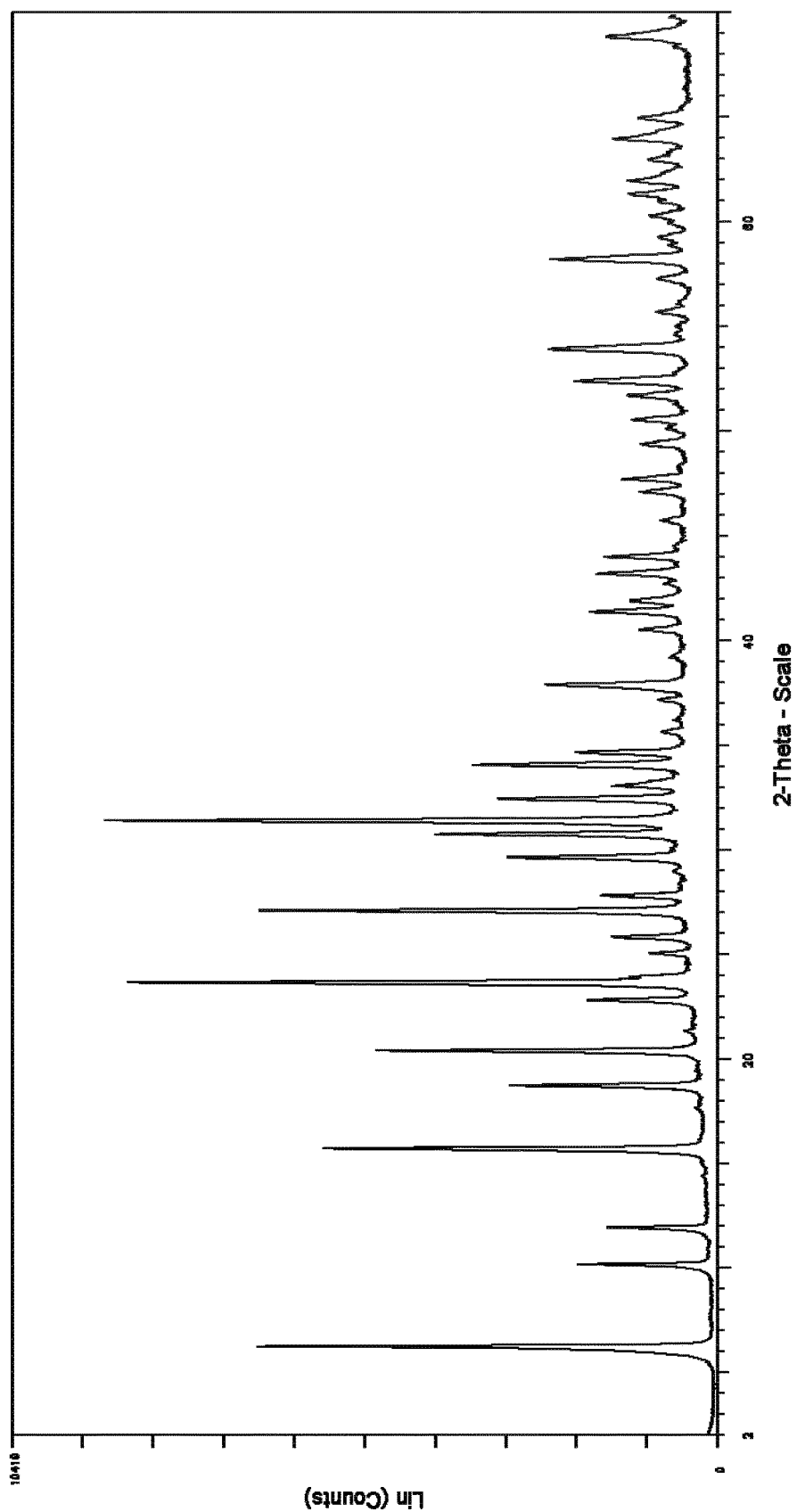
FIG. 1 shows the X-ray diffraction pattern of a Na—Y zeolite product obtained from the process of the present invention and as described in Example 1.

Example 1: Preparation of Na—Y Zeolite with Diaminomethylcyclohexane as SDA 4.9 g of NaOH-flakes were dissolved in 63 g of deionized water in a plastic beaker under stirring at room temperature. 10 g of sodium aluminate (30 wt.-% Na, 28.6 wt.-% Al) were added thereto and dissolved. 7.7 g of diaminomethylcyclohexane were subsequently added. Finally, 64.4 g of Ludox AS 40 were added thereto and the mixture was then stirred at room temperature for 1 h. The mixture was then left for 25 h at room temperature. The pH of the resulting mixture was 13. Batch composition: 3 $Na_2O$:10 $SiO_2$:1.23 $Al_2O_3$:1.4 diaminomethylcyclohexane:131 $H_2O$.

147.9 g of the resulting mixture were placed into a steel autoclave using a Teflon beaker. The autoclave was placed and heated in a dryer to a temperature of 110° C., during 1 h, and then left for 48 h (2 days) at 110° C. The pH of the resulting suspension was 12.5.

147.6 g of the resulting solid were filtered off by using a porcelain suction filter and washed with 3 l of deionized water to a conductivity of less than 200 μS/cm³.

The solid product was placed in a porcelain bowl and dried at 120° C. for 5 h and subsequently calcined by incremental heating rate of 2° C./min to 540° C. and held at that temperature for 6 h to afford 23.6 g of a white powder.

Elemental analysis of the product afforded <0.1 wt.-% of carbon, 9.8 wt.-% of Al, 7.8 wt.-% of Na and 26 wt.-% of Si.

The product displayed a BET surface area of 696 m²/g and a Langmuir surface area of 907 m²/g.

The X-ray diffraction patter of the crystalline product is displayed in FIG. 1 and displays the FAU-type framework structure.

Comparative Example 1: Preparation of Na—Y Zeolite with 15-Crown-5 as SDA According to H. Robson, Microporous Materials 22 (1998), 551-666

6.1 g of 15-crown-5 template were dissolved in 48.2 g of deionized water in a Teflon-lined autoclave (Berghof). 4.5 g of NaOH-flakes were then added thereto under stirring and dissolved at room temperature. 9.9 g of sodium aluminate (30 wt.-% Na, 28.6 wt.-% Al) were subsequently added and dissolved in the solution. Finally, 81.4 g of Ludox AS 40 were added and stirred for 1 h at room temperature. Batch composition: 2.1 $Na_2O$:10 $SiO_2$:$Al_2O_3$:0.5 (15-crown-5):100 $H_2O$. The mixture was stirred for 24 h at room temperature, the suspension starts to thicken. The pH of the resulting mixture was 13.2.

146.1 g of the resulting mixture were placed in a steel autoclave by using a Teflon beaker.

The autoclave was placed and heated in a dryer to a temperature of 110° C. during 1 h and then left for 192 h (8 days) at 110° C. The pH of the resulting suspension was 11.7.

145.9 g the resulting solid were filtered off by using a porcelain suction filter and washed with 5 l of deionized water to a conductivity of less than 200 μS/cm³.

The solid product was placed in a porcelain bowl and dried at 120° C. for 4 days in a dryer and subsequently calcined by incremental heating rate of 2° C./min to 540° C. and held at that temperature for 6 h to afford 40.2 g of a white powder.

Elemental analysis of the product afforded <0.1 wt.-% of carbon, 8.3 wt.-% of Al, 6.8 wt.-% of Na and 31 wt.-% of Si.

The product displayed a BET surface area of 756 m²/g and a Langmuir surface area of 987 m²/g.

Figure 2:
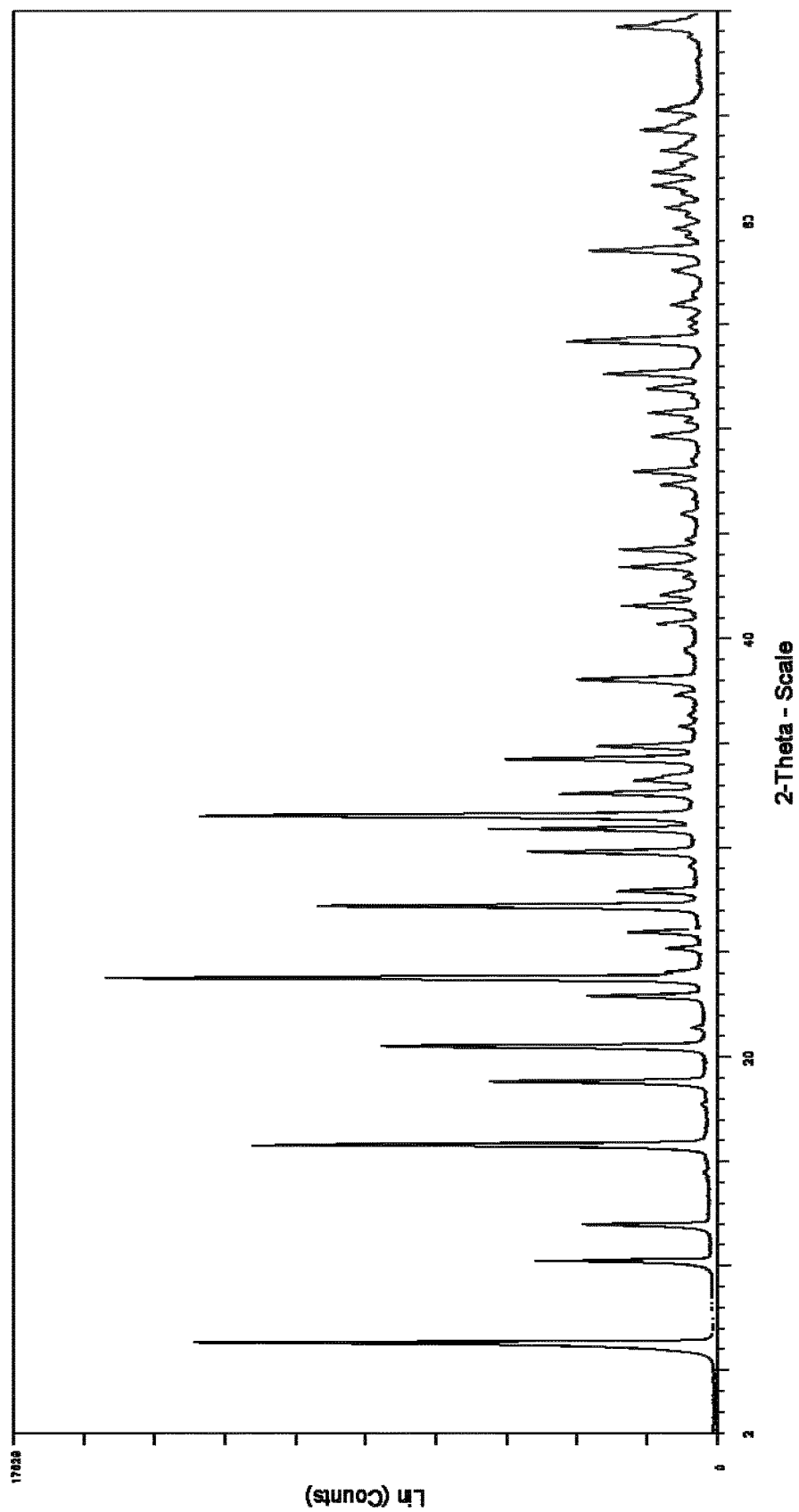
FIG. 2 shows the X-ray diffraction pattern of a Na—Y zeolite product obtained not according to the present invention and as described comparative Example 2.

The X-ray diffraction patter of the crystalline product is displayed in FIG. 2 and displays the FAU-type framework structure.

Comparative Example 2: Preparation of Na—Y Zeolite without SDA 63 g of deionized water was provided in plastic beaker. 4.9 g of NaOH-flakes were added under stirring and dissolved at room temperature. 10 g of sodium aluminate (30 wt % Na, 28.6 wt % Al) were subsequently added thereto and dissolved. Finally, 64.4 g of Ludox AS 40 was added and stirred for 1 h at room temperature. Batch composition: 3 $Na_2O$:10 $SiO_2$:1.23 $Al_2O_3$:131 $H_2O$. The mixture was then left for 25 h at room temperature. The pH of the resulting mixture was 13.2.

140.7 g of the resulting mixture were placed into a steel autoclave by using a Teflon beaker.

The autoclave is heated in a dryer up to 110° C. (within about 1 h) and hold for 48 h (2 days) at 110° C. The pH of the resulting suspension was 11.6

140.6 g of the resulting solid were filtered off by using a porcelain suction filter and then washed with 5 l of deionized water to a conductivity of less than 200 μS/cm³.

The solid product was placed in a porcelain bowl and dried at 120° C. overnight in a dryer and subsequently calcined by incremental heating rate of 2° C./min to 540° C. and held at that temperature for 6 h to afford 31.9 g of a white powder.

Elemental analysis of the product afforded 8.7 wt.-% of Al, 7.3 wt.-% of Na and 24.9 wt.-% of Si.

The product displayed a BET surface area of 305 m²/g and a Langmuir surface area of 400 m²/g.

Figure 3:
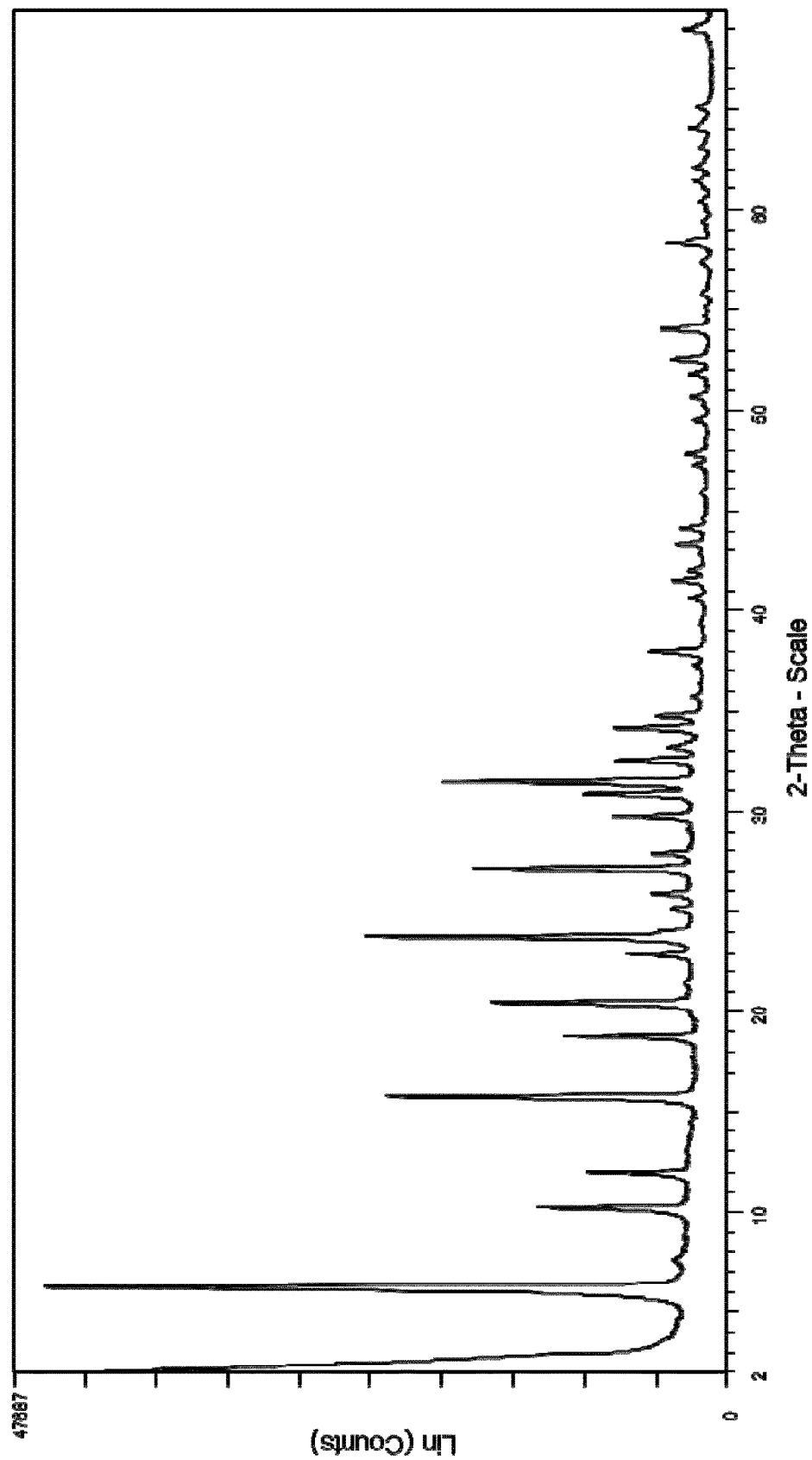
FIG. 3 shows the X-ray diffraction pattern of a Na—Y zeolite product obtained not according to the present invention and as described comparative Example 3.

The X-ray diffraction patter of the crystalline product is displayed in FIG. 3 and displays the FAU-type framework structure.

Example 2: $NH_4$-Ion Exchange of Example 1

225 g of deionized water (a portion) and 12.5 g of ammonium nitrate were provided in a 500 ml four-neck flask. The mixture was then heated up to 80° C. under stirring. After reaching that temperature, 25 g of Na—Y zeolite of Example 1 was added and rinsed with 25 g of deionized water (the rest). The resulting suspension was again heated up to 80° C. and then stirred for 30 min at that temperature (200 rpm).

The solids were filtered off by using a porcelain suction filter and washed with deionized water to an electrical conductivity of less than 200 µS/cm³.

The solid product was placed in a porcelain bowl and dried at 120° C. overnight in a dryer.

The experiment was repeated to afford 26.0 g of a white powder.

Example 3: Cu-Ion Exchange of Example 2

146 g of deionized water (a portion) were provided in 250 ml four-neck flask and heated up to 60° C. 8.6 g of copper acetate monohydrate (Sigma Aldrich) were then added thereto under stirring and again heated up to 60° C. After reaching that temperature, 25.5 g of zeolite from Example 2 were added and rinsed with 20 g of deionized water. The suspension is heated up to 60° C. again, the pH of the suspension was 5.3 at 60° C., and then stirred for 1 h at this temperature (300 rpm). The pH of the suspension after 0.5 h was 5.2 at 60° C. and the pH of the resulting suspension after 1 h was 5.2 at 60° C.

The resulting suspension was filtered through a porcelain suction filter and washed with 5 l of deionized water to an electrical conductivity of less than 200 µS/cm³.

The solid product was placed together with the porcelain suction filter in a dryer and dried at 120° C. for 16 h to afford 26.0 g of a blue powder.

Elemental analysis of the product afforded <0.1 wt.-% of carbon (high temperature), 9.8 wt.-% of Al, 5.7 wt.-% of Cu, 2.0 wt.-% of Na and 26.4 wt.-% of Si.

The product displayed a BET surface area of 666 m²/g and a Langmuir surface area of 868 m²/g.

Example 4: SCR (Selective Catalytic Reduction) Testing of Example 3

1. Shaping Procedure:

For the test, the zeolite samples of Example 3 were mixed with a slurry of pre-milled gamma alumina (30 wt.-% $Al_2O_3$, 70 wt.-% zeolite). The slurry was dried under stirring on a magnetic stirring plate at 100° C. and calcined at 600° C., in air, for 1 h. The resulting cake was crushed and sieved to a target fraction of 250 to 500 µm for testing. Fractions of the shaped powder were aged in a muffle oven at 750° C., in 10% steam/air, for 5 h.

2. Test Procedure:

The SCR tests were performed on a 48-fold parallel testing unit equipped with ABB LIMAS $NO_x/NH_3$ and ABB URAS $N_2O$ analysers. For each fresh and aged catalyst samples of Example 3, 170 mg of powder diluted with corundum to a total volume of 1 mL were placed in each reactor.

Under isothermal conditions at temperatures of 200, 300, 450 and 575° C., a feed gas consisting of 500 ppm NO, 500 ppm $NH_3$, 5% $O_2$, 10% $H_2O$ balance $N_2$ was passed at a GHSV of 80,000 $h^{-1}$ through the catalyst bed. In addition to 30 min equilibration time for thermal equilibration of the parallel reactor at each temperature, every position was equilibrated for 3.5 min followed by 30 sec sampling time. Data recorded by the analysers at a frequency of 1 Hz was averaged for the sampling interval and used to calculate NO conversions and $N_2O$ yield.

Figure 4:
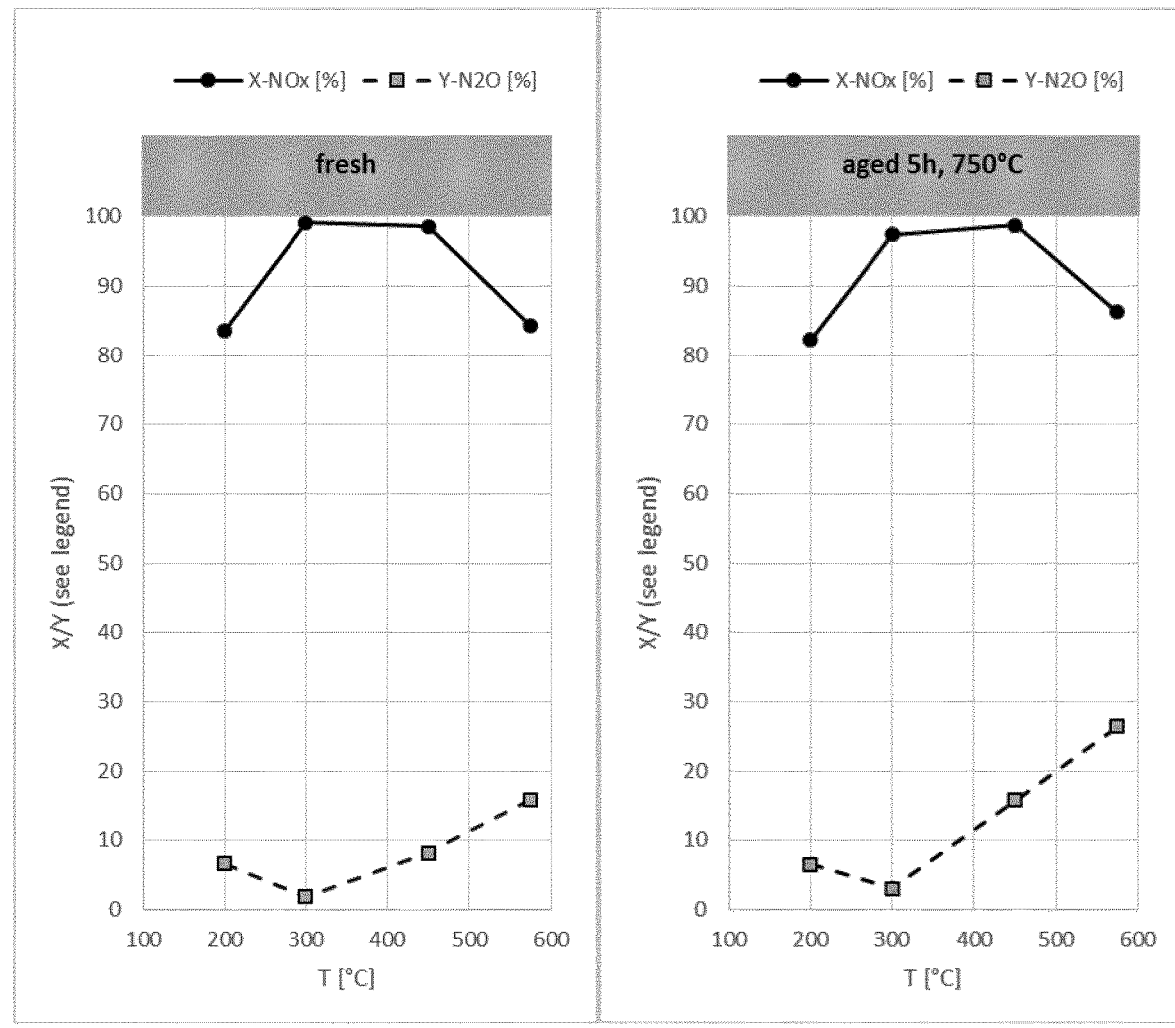
FIG. 4 displays results from catalyst testing in NOx conversion and the $N_2O$ yield performed on the copper-exchanged zeolitic material according to Example 3 after forming to a shaped body as described in Example 4. The results are shown using fresh and aged catalyst samples of Example 3. In the figure, the temperature in ° C. is shown along the abscissa and the NOx conversion rate and the $N_2O$ yield in % are plotted along the ordinate.

Thus, as may be taken from the results displayed in FIG. 4, it has unexpectedly been found that the fresh catalyst according to the present invention displays very high NOx conversion rates of around 99% at 300° C., of around 98% at 450° C. and of around 84% at 600° C., while maintaining a $N_2O$ yield under 20% at 600° C., and even under 10% at 300 and 450° C. Thus, even at high temperature, in particular at 600° C., the inventive sample comprising a Cu-containing zeolite having a FAU-type framework structure displays a great catalytic reduction of NOx, while maintaining a low yield of $N_2O$. Further, it has surprisingly been found that the aged catalyst (5 h, at 750° C.) according to the present invention displays a somewhat lower NOx conversion at 300° C. but displays the same NOx conversion at 450° C. and even a greater one at 600° C. (high temperature) than the fresh catalyst, the $N_2O$ yield remaining low, i.e. under 10 at 300° C., under 20% at 450° C. and under 30% at 600° C. Thus, it has been surprisingly found that the improved zeolitic material having a FAU-type framework structure, i.e. with high catalytic activity and aging resistance, obtained and/or obtainable according to the present invention may be produced in a cost effective manner which is furthermore adapted to large-scale production while being environmental friendly.

The invention claimed is:

1. A process for the preparation of a zeolitic material having a FAU-type framework structure comprising $YO_2$ and $X_2O_3$, said process comprising:
   (a) preparing a mixture comprising a source of $YO_2$, a source of $X_2O_3$, and a structure directing agent (SDA); and
   (b) crystallizing the zeolitic material from the mixture obtained in (a);
   wherein Y is a tetravalent element and X is a trivalent element, and
   wherein the structure directing agent comprises an isomer of diaminomethylcyclohexane.

2. The process of claim 1, wherein Y is at least one selected from the group consisting of Si, Sn, and Ge.

3. The process of claim 1, wherein X is at least one selected from the group consisting of Al, B, In, and Ga.

4. The process of claim 1, wherein the isomers of diaminomethylcyclohexane comprise 65 to 95 wt. % of 2,4-diaminomethylcyclohexane and 5 to 35 wt. % of 2,6-diaminomethylcyclohexane.

5. The process of claim 1, wherein the mixture prepared in (a) further comprises a solvent system comprising a solvent.

6. The process of claim 1, wherein a molar ratio $YO_2$:diaminomethylcyclohexane of the mixture prepared in (a) is from 0.5 to 40.

7. The process of claim 1, wherein the process further comprises one or more of the following:
   (c) isolating the zeolitic material; and/or
   (d) washing the zeolitic material with a solvent; and/or
   (e) drying the zeolitic material obtained in (c), and/or (d); and/or
   (f) calcining the zeolitic material obtained in (c), (d), and/or (e).

8. The process of claim 7, wherein the process further comprises:
   (g) subjecting the zeolitic material obtained in (c), (d), (e), or (f) to an ion exchange procedure, wherein at least one ionic non-framework element or compound contained in the zeolitic material is ion-exchanged against a metal ion.

9. The process of claim 8, wherein the metal ion is at least one selected from the group consisting of ions of alkaline earth metal elements and/or transition metal elements.

10. A process for preparing a coated substrate comprising:
(1) preparing a zeolitic material by the process of claim 1 and then preparing a mixture comprising a solvent system and the zeolitic material;
(1.a) homogenizing the mixture obtained in (1);
(1.b) providing a support substrate;
(1.c) coating the support substrate provided in (1.b) with the homogenized mixture obtained in (1.a);
(1.d) optionally drying the coated support substrate obtained in (1.c); and
(2) calcining the coated support obtained in (1.c) or (1.d).

11. The process of claim 10, wherein the support substrate comprises at least one selected from the group consisting of ceramic substances and metallic substances.

12. A process for preparing a shaped body comprising:
(1) preparing a zeolitic material by the process of claim 1 and then preparing a mixture comprising a solvent system and the zeolitic material;
(1.A) adding a refractory support material, and optionally adding a pasting agent to the mixture obtained in (1);
(1.B) homogenizing the mixture obtained in (1.A);
(1.C) shaping of the mixture obtained in (1.B); and
(2') calcining the shaped mixture obtained in (1.C).

13. A method for selectively reducing nitrogen oxides NOx, the method comprising:
preparing a zeolitic material by the process of claim 1; and
contacting a gas stream comprising NOx with the zeolitic material, wherein at least one ionic non-framework element or compound contained in the zeolitic material is ion-exchanged against Cu and/or Fe.

14. A method, comprising:
preparing a zeolitic material by the process of claim 1; and
employing the zeolitic material as a molecular sieve, as an adsorbent, for ion exchange, or as a catalyst and/or catalyst support by contacting a gas stream with the zeolitic material.

\* \* \* \* \*